US010344900B2

(12) United States Patent
Bauer

(10) Patent No.: US 10,344,900 B2
(45) Date of Patent: Jul. 9, 2019

(54) COUPLING DEVICE WITH SMALL SPACE REQUIREMENT

(75) Inventor: Andreas Bauer, Maintal (DE)

(73) Assignee: NORMA GERMANY GMBH, Maintal (DE)

(*) Notice: Subject to any disclaimer, the term of this patent is extended or adjusted under 35 U.S.C. 154(b) by 1449 days.

(21) Appl. No.: 12/683,570

(22) Filed: Jan. 7, 2010

(65) Prior Publication Data
US 2010/0176589 A1 Jul. 15, 2010

(30) Foreign Application Priority Data
Jan. 8, 2009 (DE) .................... 20 2009 000 328 U

(51) Int. Cl.
F16L 37/088 (2006.01)
F16L 37/14 (2006.01)
F01P 11/04 (2006.01)
B29C 65/00 (2006.01)

(52) U.S. Cl.
CPC ............ F16L 37/144 (2013.01); B29C 65/00 (2013.01); F01P 11/04 (2013.01); F16L 37/088 (2013.01)

(58) Field of Classification Search
CPC ........ F16L 37/08; F16L 37/142; F16L 37/144
USPC ................... 285/345, 319, 288.6, 288.5, 349
See application file for complete search history.

(56) References Cited

U.S. PATENT DOCUMENTS

| 3,826,523 | A | * | 7/1974 | Eschbaugh | ............ | 285/39 |
| 4,640,534 | A | * | 2/1987 | Hoskins et al. | ............ | 285/143.1 |
| 4,884,829 | A | * | 12/1989 | Funk et al. | ............ | 285/24 |
| 7,201,403 | B2 | * | 4/2007 | Takayanagi et al. | ......... | 285/321 |
| 2001/0043833 | A1 | | 11/2001 | Bahner et al. | | |
| 2003/0052484 | A1 | * | 3/2003 | Rautureau | ............ | 285/305 |
| 2004/0178629 | A1 | * | 9/2004 | Yoshida | ............ | 285/305 |
| 2005/0136741 | A1 | * | 6/2005 | Yoshida et al. | ............ | 439/622 |
| 2006/0214420 | A1 | * | 9/2006 | Mori et al. | ............ | 285/319 |
| 2006/0273578 | A1 | | 12/2006 | Bauer et al. | | |
| 2007/0059972 | A1 | | 3/2007 | Rigollet et al. | | |
| 2007/0227846 | A1 | | 10/2007 | Park | | |
| 2008/0001398 | A1 | | 1/2008 | Stoll et al. | | |
| 2008/0224469 | A1 | * | 9/2008 | Ostergren et al. | ............ | 285/313 |

FOREIGN PATENT DOCUMENTS

| DE | 199 33 061 | | 10/2000 | | |
| DE | 10017679 | * | 9/2001 | ............ | F16L 37/088 |
| DE | 10017679 C1 | * | 9/2001 | ............. | F16L 37/14 |
| DE | 20 2007 017 181 U1 | | 4/2008 | | |

(Continued)

OTHER PUBLICATIONS

DE 10017679 C1 (Bauer Andreas) Sep. 6, 2001 (Machine Translation of the Description) [online]. [Retrieved: Nov. 26, 2014]. Retrieved from the Internet:<URL: http://translationportal.epo.org/emtp/translate/?ACTION=description-retrieval&COUNTRY=DE&ENGINE=google&FORMAT=docdb&KIND=C1&LOCALE=en_EP&NUMBER=10017679&OPS=ops.epo.org/3.1&SRCLANG=de&TRGLANG=en>.*

(Continued)

Primary Examiner — David Bochna
Assistant Examiner — James A Linford
(74) Attorney, Agent, or Firm — Greenblum & Bernstein, P.L.C.

(57) ABSTRACT

Coupling device and method of forming coupling device. The coupling device includes a first part with a first connection region, and a second part with a second connection region. A sealing ring arranged between the first part and the second part radially extends into the first connection region.

9 Claims, 2 Drawing Sheets

(56) References Cited

FOREIGN PATENT DOCUMENTS

| | | |
|---|---|---|
| EP | 1 724 510 | 11/2006 |
| FR | 2 795 156 | 12/2000 |
| JP | 2004-125034 | 4/2004 |
| JP | 2004-211812 | 7/2004 |
| KR | 2006-16094 | 2/2006 |
| WO | 93/14341 | 7/1993 |

OTHER PUBLICATIONS

Korea Office action that issued with respect to patent family member Korean Patent Application No. 10-2010-0001188, dated Sep. 27, 2011 along with an english translation thereof.
China Office action that issued with respect to patent family member Korean Patent Application No. 201010121760.X, dated Jul. 13, 2011 along with an english translation thereof.

* cited by examiner

COUPLING DEVICE WITH SMALL SPACE REQUIREMENT

CROSS-REFERENCE TO RELATED APPLICATIONS

The present application claims priority under 35 U.S.C. § 119(a) of German Patent Application No. 20 2009 000 328.0 filed Jan. 8, 2009, the disclosure of which is expressly incorporated by reference herein in its entirety.

BACKGROUND OF THE INVENTION

1. Field of the Invention

The invention relates to a coupling device which has a first part with a first connection region and a second part with a second connection region.

2. Discussion of Background Information

A coupling device of the type generally discussed above is used, for example, for connecting two sections of a line. Such a coupling is thus used, for example, in a cooling water system of a motor vehicle engine for connecting a cooling water hose to a connection on the engine or on the radiator. In this case, the first connection region is generally formed in such a way that it can be releasably connected to a coupling counterpart. The second connection region is then often formed in such a way that it can, for example, be fixedly connected to the cooling water hose.

DE 20 2007 017 181 U1 discloses such a coupling for connecting two sections of a cooling system. Moreover, it is possible for the two parts of the coupling to be welded to each other. A closing device which serves for controlling the throughflow of coolant is arranged between the two parts of the coupling. Provided in the first part is an annular seal, which serves for providing a seal with respect to an insertion part that can be inserted into the first part. Such a coupling has a relatively great axial length.

SUMMARY OF THE INVENTION

In the engine compartment of a motor vehicle, the space is generally restricted. Therefore, embodiments of the invention are directed to providing a coupling device having a small space requirement.

According to embodiments of the invention, a coupling device of the type mentioned at the beginning can include a sealing ring extending radially into a first connection region and arranged between a first part and a second part of the coupling device.

The sealing ring is in contact both with the first part and with the second part and thereby undertakes several tasks. The sealing ring serves for sealing the connection between the first part and the second part and provides a seal with respect to an insertion element that can be inserted into the first connection region. Since the sealing ring is arranged between the first part and the second part, e.g., at the end of the first part, a relatively long guiding length is available in the first connection region even if the first part is of a relatively short form. The coupling device can therefore be formed such that it is relatively short, so that it has only a small space requirement.

The sealing ring is preferably arranged in a groove which is formed in the first part, and a side wall of the groove is formed by an end face of the second part. The sealing ring is kept in the desired position by the groove. The fact that the end face of the second part forms a side wall of the groove makes it possible to dispense with a corresponding web in the first part, so that the axial length can be shortened further. At the same time, the sealing ring thus provides a seal between the first part and the second part.

In particular embodiments, the first part is connected to the second part by a material bond, in particular is welded. A materially bonded connection achieves a hermetically sealed connection between the two parts. If appropriate, there may also be a connection geometry to increase the contact area between the first part and the second part. A great overlap between the first part and the second part, as required for example in the case of a press fit, is not necessary in the case of a materially bonded connection. All this has the effect that the coupling device can be formed in a relatively compact manner. The first part can be connected to the second part in different axial positions. Different tools are not necessary for this in the case of a welded connection. The range of variation with which the coupling device can be produced is therefore very great. The first part may also be provided with differently formed second parts, without special tools being required.

A coupling counterpart can advantageously be inserted into the first connection region, and a stop for the coupling counterpart can be provided in the second part. The coupling counterpart therefore passes through the first part and reaches into the second part. The guidance for the coupling counterpart is therefore not only applied by the first part but also by the second part. As a result, the first part can be of a relatively short form. On account of the materially bonded, and consequently hermetically sealed, connection between the first part and the second part as well as the sealing ring that is arranged between the first part and the second part, it is not necessary for the coupling counterpart to be introduced far into the second part. The second part can therefore also be made with a relatively short axial length.

The first part can preferably have a locking device with which the coupling counterpart can be fixed in a locking manner. The coupling counterpart is therefore releasably connected to the first part. This is important in particular for repair work. A locking connection thereby ensures that unintentional release does not occur.

The locking device can preferably have a clip which is perpendicularly movable in relation to the direction of insertion of the coupling counterpart. Consequently, it is all but impossible for the locking device to be released by simply pulling on the coupling counterpart. In particular, a force that is perpendicular to a possible direction of movement of the coupling counterpart must be applied to the clip for release. The clip may in this case be guided in a form-fitting manner in the first part in the direction of movement of the coupling counterpart.

The first part advantageously has at least one sloping face on which one end of the clip is guided. The sloping face is arranged at an acute angle in relation to the direction of movement of the clip. A movement of the clip then causes it to be spread open, since the end of the clip is guided outwards over the sloping face when it is pulled out. Complete removal of the clip is then not necessary in order to remove the coupling counterpart. A small amount of space is then also adequate for opening the clip, since the clip does not have to be removed completely, but only has to be moved over a relatively short distance.

In particular embodiments, the clip is a U-shaped form having two ends, each of which is guided on a sloping face. The clip is then spread open symmetrically when it is pulled out. As a result, a very short adjusting movement of the clip is adequate to release the coupling counterpart. At the same time, secure retention of the coupling counterpart in the first part is ensured in the locked-in state.

The sloping face is preferably bounded by two stops. These stops serve as a captive securement device, so that the clip cannot be unintentionally pulled out and lost.

In particular embodiments, the first connection region extends perpendicularly in relation to the second connection region. This form is advantageous in particular when space is restricted. Angles other than 90° between the first connection region and the second connection region are also conceivable.

Embodiments of the invention are directed to a coupling device that includes a first part with a first connection region, and a second part with a second connection region. A sealing ring arranged between the first part and the second part radially extends into the first connection region.

According to embodiments, the sealing ring can be arranged in a groove at least in part formed in the first part, while a side wall of the groove may be formed by an end face of the second part.

In accordance with other embodiments of the invention, the first part can be connected to the second part by a material bond. Further, the material bond can include a welded bond.

According to embodiments of the instant invention, the first connection region can be structured to receive an inserted coupling counterpart and the second part may include a stop to limit an insertion distance for the coupling counterpart.

In accordance with further embodiments, the first part can include a locking device structured and arranged to fix in a locking manner a coupling counterpart inserted into the first part. The locking device can have a clip that is perpendicularly movable in relation to a direction in which the coupling counterpart is inserted into the first part. Moreover, the first part can also include at least one sloping face and the clip may include at least one end that is guided on the at least one sloping face. The at least one sloping face can be arranged at an acute angle in relation to a direction of movement of the clip. Still further, the clip may include a U-shaped form having two ends and the first part may include sloping faces on which each of the two ends are guided. Also, at least two stops can be arranged as boundaries for the sloping faces.

According to other embodiments of the present invention, the first connection region can extend perpendicularly in relation to the second connection region.

In accordance with further embodiments, the second part is connectable to a hose.

Embodiments of the instant invention are directed to a method of forming a coupling device. The method includes forming a first part having a free end, a first connection end, a first connection region, and at least a part of a groove near the first connection end, and forming a second part having a second connection end that is complementary to the first connection end, and a second connection region. The method also includes placing a sealing ring in the groove and joining the first and second connection ends together so that at least a portion of an end face of the second connection end forms a sidewall of the groove and so that at least a portion of the sealing ring radially extends into the first connection region.

According to embodiments of the invention, the first and second connection ends can be joined by welding.

In accordance with still yet other embodiments of the present invention, the method can further include forming on the first part a locking device, which includes a clip, to fix in a locking manner a coupling counterpart insertable into the first connection region. The clip can include a U-shaped form having two legs and the method can further include forming on the first part sloping faces on which ends of the two legs are guided. The method can also include forming in the first part openings into which portions of the two legs protrude into the first connection region when the locking device is in a locked position. Moreover, when placing the locking device in an unlocked position, the ends of the two legs may be guided in opposite directions until the portions of the legs do not protrude into the first connection region. Still further, the ends of the two legs can be formed to be generally L-shaped.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
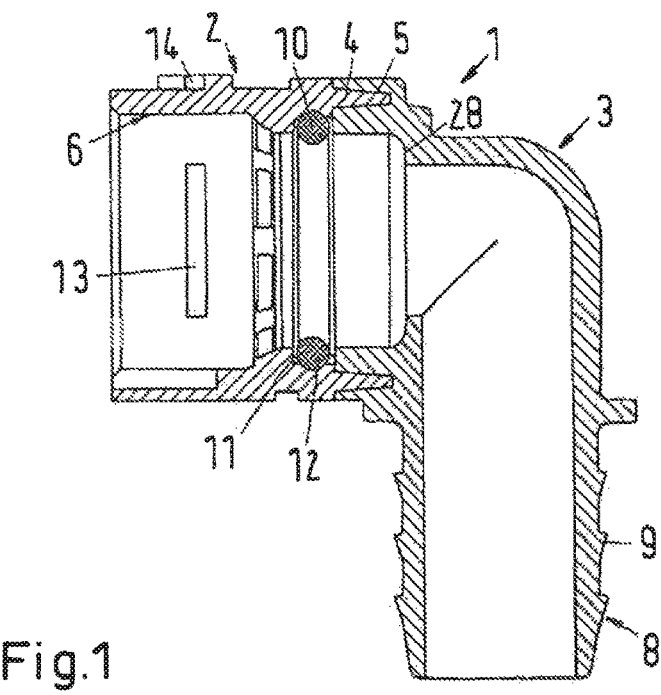
FIG. 1 illustrates a coupling device in a sectional view.

FIG. 1 shows a coupling device 1 which has a first part 2 and a second part 3. The first part 2 and the second part 3 are connected to each other in a materially bonded manner. By way of non-limiting example, the two parts 2 and 3 can be welded to each other. In addition, the first part 2 has a connection geometry 4, which interacts with a corresponding (complementary) geometry 5 on second part 3. As a result, a connecting area between first part 2 and second part 3 is increased in size, so that a hermetically sealed connection is ensured.

First part 2 has a first connection region 6, into which a coupling counterpart (not shown) can be inserted. Second part 3 has a second connection region 8, onto which the end of a hose can be pushed. To secure the hose, peripheral ribs 9 are provided in the second connection region 8. In addition, or alternatively, the hose may be secured at the connection region 8 with the aid of, e.g., a hose clamp.

A sealing ring 10 is provided between first part 2 and second part 3, sealing ring 10 being arranged in a groove defined by end face 11, which is formed in first part 2. An opposite side wall of the groove 11 is formed by an end face 12 of the second part. The end faces or surfaces 11 and 12 are shown in FIG. 1 as being annular surfaces. Sealing ring 10 extends radially into first connection region 6, so as to lie securely against the inserted coupling counterpart. In the case of this exemplary embodiment, coupling counterpart has a groove in which sealing ring 10 is accommodated.

Figure 2:
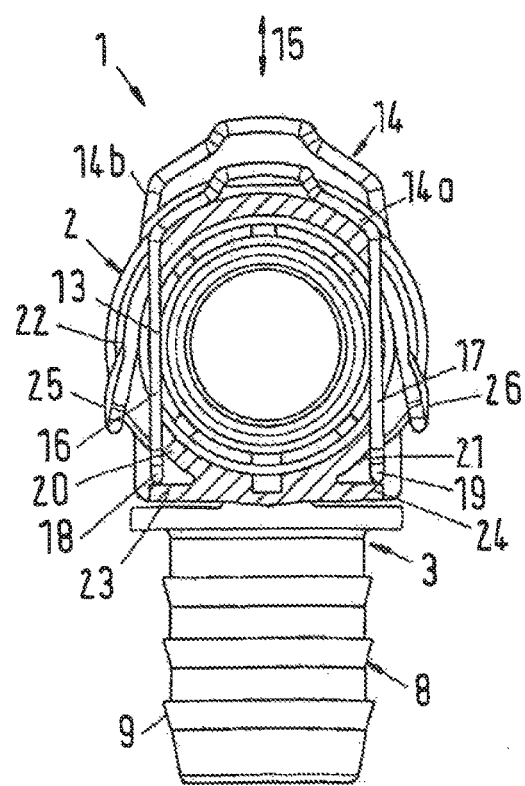
FIG. 2 illustrates the coupling device in a partly sectioned form.

Coupling counterpart has two rectangular indentations 13 tangentially. A locking device which has a clip 14 (FIG. 2) interacts with these indentations 13. Clip 14 is perpendicularly movable in relation to the direction of movement of coupling counterpart. The movement of clip 14 is indicated in FIG. 2 by an arrow 15. Clip 14 is of a U-shaped form and has two legs 16 and 17 each with an end 18 and 19. Ends 18 and 19 of clip 14 are respectively guided on sloping faces 20 and 21, which are arranged on the first part 2. Sloping faces 20 and 21 can be arranged substantially tangentially on first part 2.

FIG. 2 shows the clip 14 in a first, locked position 14a and a second, released position 14b. In locked position 14a, legs 16 and 17 protrude through openings 22 in first part 2, so that legs 16 and 17 are in engagement with indentations 13 in coupling counterpart. Axial movement of coupling counterpart is thereby prevented. Openings 22 serve at the same time for the axial securement of clip 14 in first part 2. In locked position 14a, ends 18 and 19 of clip 14 do not necessarily lie against sloping faces 20 and 21. Ends 18 and 19 are secured by stops 23 and 24 of sloping faces 20 and 21.

In released position 14b, clip 14 is linearly shifted upwardly in the direction of arrow 15 in comparison with locked position 14a. As a result, ends 18 and 19 have been pressed apart along sloping faces 20 and 21. As a result, legs 16 and 17 have been moved out of indentations 13, so that coupling counterpart can be taken out axially from first connection region 6. Removal of clip 14 is prevented by stops 25, 26 on sloping faces 20 and 21. As a result, it is all but impossible to lose clip 14. At the same time, it is ensured that legs 16 and 17 are not moved out of openings 22 completely, so that the axial position of clip 14 also remains secured.

It is ensured by sloping faces 20 and 21 that, when there is a relatively small movement of clip 14 in a direction perpendicular to the direction of movement of coupling counterpart, relatively great spreading apart of legs 16 and 17 takes place. Therefore, only relatively little free space has to be available for the movement of the clip, and consequently for releasing of the locking device. At the same time, ends 18 and 19 of the clip may be of a relatively simple form, since the guidance of the movement takes place by sloping faces 20 and 21.

Figure 3:
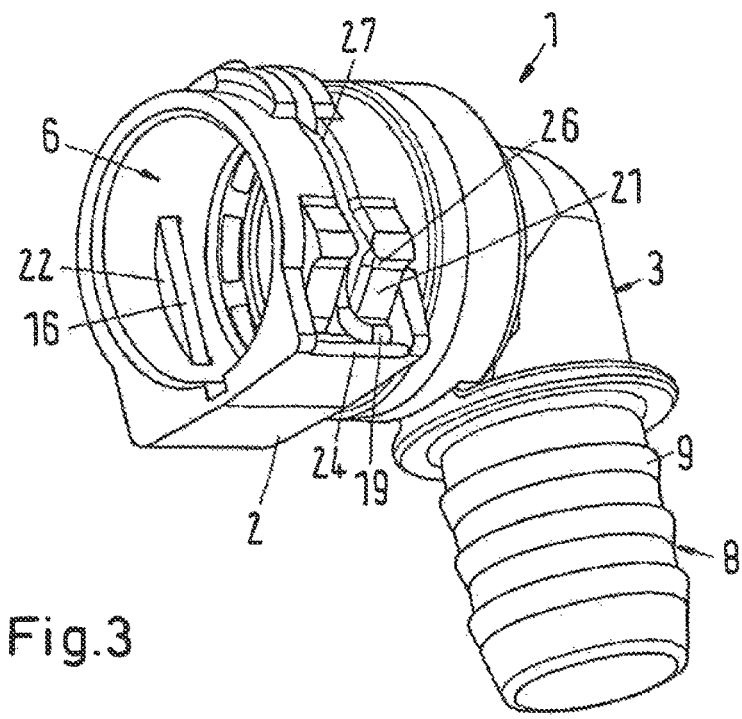
FIG. 3 illustrates the coupling device in a three-dimensional representation.

FIG. 3 shows coupling device 1 without coupling counterpart. Clip 14 is in the locked position. It can be seen that leg 16 protrudes through opening 22 in first part 2. When coupling counterpart is appropriately inserted, this visible part of leg 16 can then lock with indentations 13 of coupling counterpart. Clip 14 is guided in first part 2 not only in openings 22 but also in a groove 27. This all but rules out the risk of other parts becoming caught on clip 14 and unintentionally opening it. At the same time, a relatively good force transfer can take place from clip 14 to first part 2.

Figure 4:
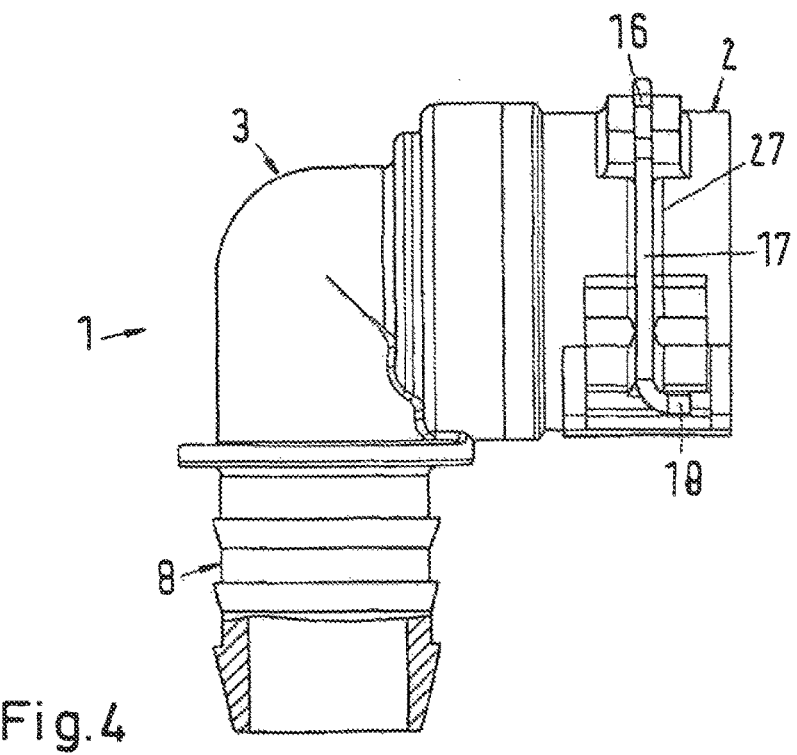
FIG. 4 illustrates a side view of the coupling device.

FIG. 4 shows coupling device 1 in side view. First connection region 6 is arranged perpendicularly in relation to second connection region 8. It can be seen that ends 18 and 19 of the clip 14 are shaped by simple bending out. On account of sloping faces 20 and 21, a simple form of such a kind is adequate.

The materially bonded connection, e.g., by welding, between first part 2 and second part 3 allows coupling device 1 to be of a very compact form. This is further assisted by annular sealing ring 10 being arranged between the first part 2 and the second part 3, and being kept in its position both by first part 2 and by second part 3. Therefore, only a small axial space is required for sealing ring 10. At the same time, coupling counterpart may be accommodated in a guided manner both by first part 2 and by second part 3. Coupling counterpart is prevented from being inserted too far by a stop 28 in second part 3. Since the guidance length of first part 2 and second part 3 are added together, an adequately great guidance length is obtained even if each part 2 and 3 only provides a relatively small guidance length. In this way, a very compact coupling device 1 that can be used even in confined spaces is obtained overall.

The provision of sloping faces 20 and 21 makes it possible to obtain a locking connection between first part 2 and coupling counterpart that requires only a small free space for release. As a result, the possibilities for which coupling device 1 can be used are further extended.

The provision of a welded connection between first part 2 and second part 3 allows second part 3 to be arranged at virtually any desired angle in relation to first part 2. First part 2, which has locking device 14, may also be combined with differently formed second parts 3, so that, for example, the angle between first connection region 6 and second connection region 8 is variable.

Altogether, the materially bonded connection therefore makes a great range of variation possible, with no special tools being required.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A coupling device comprising:
   a first part;
   a second part;
   a sealing ring; and
   a clip,
   wherein:
   the clip is constructed and arranged to fix in a locking manner a coupling counterpart when the coupling counterpart is inserted into an open end of the first part;
   the sealing ring is in contact with the first part and with the second part and extends radially along an internal surface of the first part,
   the first part comprises two sloping faces having an acute angle in a direction of the clip movement, the clip is movable in a perpendicular direction with respect to a direction in which the coupling counterpart can be inserted into the first part, and comprises a U-shaped form having two ends which are guided on the sloping faces of the first part;

at least one sloping face of the first part comprises a stop structured and arranged to block further movement of the clip toward an unlocking position from a locking position;

the two ends of the clip are arranged on one side of an imaginary plane passing through a center axis of the first part in each of the locked and unlocked positions, and wherein the first part is connected to the second part by a material bond.

2. The coupling device in accordance with claim 1, wherein the sealing ring is arranged in a groove at least in part formed in the first part, while a side wall of the groove is formed by an end face of the second part.

3. The coupling device in accordance with claim 1, wherein the material bond comprises a welded bond.

4. The coupling device in accordance with claim 1, wherein the first part extends perpendicularly in relation to the second part.

5. The coupling device in accordance with claim 1, wherein the second part is connectable to a hose.

6. The coupling device in accordance with claim 1, wherein the stop of the at least one sloping face is arranged on one side the imaginary plane passing through the center axis of the first part while a grippable part of the clip is arranged on an opposite side of the imaginary plane in each of the locked and unlocked positions.

7. The coupling device in accordance with claim 1, wherein the two ends are caused to move away from each other continuously by the sloping faces when moved from the locked to the unlocked positions.

8. A coupling device comprising:
a first part;
a second part;
a sealing ring; and
a clip,
wherein:
the clip is constructed and arranged to fix in a locking manner a coupling counterpart when the coupling counterpart is inserted into an open end of the first part;
the sealing ring is in contact with the first part and with the second part and extends radially along an internal surface of the first part,
the first part comprises two sloping faces having an acute angle in a direction of the clip movement,
the clip is movable in a perpendicular direction with respect to a direction in which the coupling counterpart can be inserted into the first part, and comprises a U-shaped form having two ends which are guided on the sloping faces of the first part;
at least one sloping face of the first part comprises a stop structured and arranged to block further movement of the clip toward an unlocking position from a locking position;
the two ends of the clip are arranged on one side of an imaginary plane passing through a center axis of the first part in each of the locked and unlocked positions, and
wherein the second part comprises a stop to limit an insertion distance for the coupling counterpart.

9. A coupling device comprising:
a first part;
a second part;
a sealing ring; and
a clip,
wherein:
the clip is constructed and arranged to fix in a locking manner a coupling counterpart when the coupling counterpart is inserted into an open end of the first part;
the sealing ring is in contact with the first part and with the second part and extends radially along an internal surface of the first part,
the first part comprises two sloping faces having an acute angle in a direction of the clip movement,
the clip is movable in a perpendicular direction with respect to a direction in which the coupling counterpart can be inserted into the first part, and comprises a U-shaped form having two ends which are guided on the sloping faces of the first part;
at least one sloping face of the first part comprises a stop structured and arranged to block further movement of the clip toward an unlocking position from a locking position;
the two ends of the clip are arranged on one side of an imaginary plane passing through a center axis of the first part in each of the locked and unlocked positions, and
wherein the stop of the at least one sloping face is arranged on one side the imaginary plane passing through the center axis of the first part while a grippable part of the clip is arranged on an opposite side of the imaginary plane in each of the locked and unlocked positions.

* * * * *